(12) United States Patent
Schmidt et al.

(10) Patent No.: US 8,315,076 B2
(45) Date of Patent: Nov. 20, 2012

(54) CIRCUIT ARRANGEMENT HAVING A DUAL COIL FOR PRODUCING AN ALTERNATING VOLTAGE OR AN ALTERNATING CURRENT

(75) Inventors: Heribert Schmidt, Freiburg (DE); Bruno Burger, Freiburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1062 days.

(21) Appl. No.: 12/158,856

(22) PCT Filed: Dec. 22, 2006

(86) PCT No.: PCT/EP2006/012650
§ 371 (c)(1),
(2), (4) Date: Oct. 24, 2008

(87) PCT Pub. No.: WO2007/073946
PCT Pub. Date: Jul. 5, 2007

(65) Prior Publication Data
US 2009/0168467 A1    Jul. 2, 2009

(30) Foreign Application Priority Data

Dec. 23, 2005 (DE) .......................... 10 2005 062 845
Mar. 3, 2006 (DE) .......................... 10 2006 010 954
Mar. 13, 2006 (DE) .......................... 10 2006 012 164

(51) Int. Cl.
*H02M 7/5387* (2007.01)
*H02M 7/44* (2006.01)

(52) U.S. Cl. ............................. 363/132; 363/98; 323/906

(58) Field of Classification Search .................... 363/55, 363/56.01, 56.05, 95, 97, 98, 131, 132, 906
See application file for complete search history.

(56) References Cited

U.S. PATENT DOCUMENTS

| | | | |
|---|---|---|---|
| 3,553,523 A * | 1/1971 | Budd ..................... | 315/368.27 |
| 4,218,647 A * | 8/1980 | Haas ..................... | 323/268 |
| 4,286,314 A * | 8/1981 | Molyneux-Berry ......... | 363/55 |
| 4,935,861 A * | 6/1990 | Johnson et al. ............ | 363/132 |
| 5,153,365 A * | 10/1992 | Chang ..................... | 89/1.11 |

(Continued)

FOREIGN PATENT DOCUMENTS

DE        196 42 522        4/1998

(Continued)

OTHER PUBLICATIONS

International Search Report of PCT/EP2006/012650, Date of Completion Apr. 25, 2007, Date of Mailing May 11, 2007, pp. 3.

(Continued)

*Primary Examiner* — Gary L Laxton
*Assistant Examiner* — Zekre Tsehaye
(74) *Attorney, Agent, or Firm* — Millen, White, Zelano & Branigan, P.C.

(57) ABSTRACT

The invention relates to a circuit arrangement for producing an alternating voltage or an alternating current from a unipolar direct current source having an inverter relating to a neutral conductor. The direct current source is connected to an inverter which converts the unipolar voltage of the direct current source into a bipolar intermediate circuit voltage that is stored in a buffer circuit ($C_1$, $C_2$) which is connected to the inverter. The inverter comprises a clocked switch ($S_o$) and an energy converting unit which is configured as a dual coil ($DR_1$, $DR_2$) having two windings ($W_1$, $W_2$) which are closely coupled to each other.

22 Claims, 6 Drawing Sheets

U.S. PATENT DOCUMENTS

| | | | |
|---|---|---|---|
| 5,610,804 A * | 3/1997 | Shimizu | 363/21.16 |
| 5,814,903 A * | 9/1998 | Wu | 307/125 |
| 5,977,753 A | 11/1999 | Edwards et al. | |
| 6,349,044 B1 * | 2/2002 | Canales-Abarca et al. | 363/17 |
| 7,046,534 B2 * | 5/2006 | Schmidt et al. | 363/132 |
| 7,514,903 B2 * | 4/2009 | Lee | 320/150 |
| 7,773,392 B2 * | 8/2010 | Matsumoto | 363/21.07 |
| 2003/0075211 A1 | 4/2003 | Makita et al. | |
| 2004/0164557 A1 | 8/2004 | West | |
| 2005/0105229 A1 | 5/2005 | Deng et al. | |

FOREIGN PATENT DOCUMENTS

| | | |
|---|---|---|
| DE | 197 32 218 | 3/1999 |
| DE | 102 21 592 A1 | 3/2003 |
| DE | 102004037446 * | 6/2006 |
| EP | 1 291 997 A | 3/2003 |
| EP | 1369985 A2 | 12/2003 |

OTHER PUBLICATIONS

Karschny Dietrich, "Wechselrichter," Espacenet, Publication Date: Apr. 23, 1998; English Abstract of DE-196 42 522.

Schekulin Dirk, "Transformerless ac. Inverter circuit, for coupling photovoltaic system or wind generator systems, esp. in the low power range, to current networks," Espacenet, Publication Date: Mar. 18, 1999; English Abstract of DE-197 32 218.

* cited by examiner

CIRCUIT ARRANGEMENT HAVING A DUAL COIL FOR PRODUCING AN ALTERNATING VOLTAGE OR AN ALTERNATING CURRENT

FIELD OF THE INVENTION

The invention relates to a circuit arrangement for producing an alternating voltage or an alternating current according to the preamble of the main claim.

DESCRIPTION OF THE RELATED ART

A large number of circuit arrangements for producing an alternating (AC) voltage or an alternating (AC) current from a unipolar direct (DC) voltage source is known, a differentiation being made in the case of these inverters between inverters without galvanic separation, i.e. transformerless inverters, and those with galvanic separation, i.e. transformer inverters.

The highest efficiency is achieved with transformerless inverters in a full-bridge circuit without step-up converters. In the case of these circuits, the potential of the source with mains frequency and half mains voltage oscillates relative to earth potential. Hence a restriction exists in the applicability of these concepts in the case of sources with a high stray or leakage capacitance relative to earth potential, as is the case for example with solar generators of specific technology, in particular thin-film modules.

Furthermore, transformerless concepts are known, e.g. from DE 196 42 522 C1 and DE 197 32 218 C1, in which one terminal of the solar generator is connected rigidly to the neutral conductor and hence has a fixed potential relative to earth potential. In the case of these known circuit arrangements, also in the case of any high leakage capacitances, in principle no leakage currents can flow. In the case of these single phase supplying inverters, a buffer capacitor is required which is located at the input of the inverter and must cover the entire input voltage range. This design is therefore not optimal and is expensive. In addition, the mentioned concepts are distinguished by high complexity and poor efficiency.

US 2004/0 164 557 describes a solar inverter in which the solar generator is connected, on the one side, to the neutral connector of the mains and supplies an intermediate circuit with two capacitors which serve for buffering, which is configured to be bipolar relative to the neutral conductor. Since the output voltage of the solar generator actually forms the positive intermediate circuit voltage relative to the potential of the neutral conductor, for example with 230 V effective (RMS) mains voltage, only solar generator voltages greater than 350 V can be used, which in practice represents a considerable restriction.

SUMMARY OF THE INVENTION

The object therefore underlying the invention is to produce a circuit arrangement for producing an alternating voltage or an alternating current from a grounded, unipolar voltage, i.e. a direct voltage source which is connected rigidly to the neutral conductor, which offers high efficiency, which is based on simple, economical, reliable structures which are easily controllable with respect to control technology, and permits an input voltage range both below and above the mains voltage amplitude (typically 325 V with an effective value of 230 V).

This object is achieved according to the invention by the characterising features of the main claim in conjunction with the features of the preamble.

Advantageous developments and improvements are possible as a result of the measures indicated in the sub-claims.

The concept comprises a converter stage which converts the input voltage, i.e. the voltage made available by a direct voltage source, such as for example a solar generator, into a bipolar intermediate circuit voltage of e.g. +/−350 V which is stored in capacitors, and an inverter which produces an alternating current from this bipolar intermediate circuit voltage which can be supplied then into the mains. The direct voltage source, i.e. the solar generator, is thereby connected rigidly to the neutral conductor by means of a terminal.

Of advantage in this concept is the decoupling of the input side from the output side via the controlled voltage of the intermediate circuit. Furthermore, the capacitor which is required in the case of a single phase supplying inverter for intermediate storage of energy, in the case of the present invention the two intermediate circuit capacitors, is at a high voltage level which is independent of the input voltage and can be optimised at this voltage level and hence become significantly more economical.

The converter is thereby configured as a choke converter which has a clocked switch and two windings which are disposed closely coupled to each other, and which, in contrast to the state of the art (DE 196 42 522 C1 and DE 197 32 218 C1), need to be designed only for the nominal power of the inverter since energy can be stored in the voltage intermediate circuit and not to the power which is twice as high when occurring at the maximum of the output current.

A further advantage of this concept resides in the fact that the input voltage can be both smaller and greater in value than the voltage of the intermediate circuit capacitors and hence energy sources with a wide voltage range can be connected.

The configuration according to the invention has the advantage in addition that a recovery path via the assigned recovery diodes into the high-capacitance intermediate circuit capacitors is always inherently present for the energy stored in the dual coil. This is required for safe shut down in all operating states (emergency cut-off).

It is particularly advantageous that the windings of the dual coil are connected such that some of the respectively assigned winding ends are at rest potential (neutral conductor or intermediate circuit capacitor) and the others of the respectively assigned winding ends have the same voltage course offset by the value of the intermediate circuit voltage, and consequently no cyclic recharging of the coupling capacitances between the windings is required, as a result of which smaller peak currents occur at the switch $S_0$ and the efficiency and also the EMC behaviour are improved.

It is advantageous that the windings of the converter coil which is termed dual coil have the same numbers of turns and are configured closely coupled to each other since the same voltage is consequently induced in both so that, in the ideal case, the two buffer capacitors or also intermediate circuit capacitors are charged to the same voltage without balancing measures. By further provision of a capacitor $C_3$ between the winding ends with the same temporal voltage course, the energy stored in the unavoidable leakage inductances of the dual coil can be absorbed when opening the switch $S_0$ and in the next cycle portion are transmitted almost loss-free to the intermediate circuit.

In another advantageous embodiment, a limiting circuit is provided for limiting the voltage at the second winding of the dual coil during connection of the clocked switch, which has a coupling capacitor connected to the second winding and diodes connected to it. The limiting circuit prevents, in the interaction of the coupling capacitor with the diodes, occurrence of damaging high voltages via the recovery diode assigned to the second winding due to transient phenomena at the second winding when switching on the clocked switch. In this embodiment, the windings are designed differently with respect to their turns, i.e. the second winding has more turns, as a result of which the coupling capacitor can be kept small.

Advantageously, the obtained bipolar intermediate circuit voltage is converted via the subsequently connected inverter which is known per se into a mains-conforming alternating current.

By using an inverter in the form of a three-point circuit, which is known per se, or of an inverter with additional recovery paths, improved efficiency and improved EMC behaviour can be achieved by reducing the current ripple.

The circuit arrangement according to the invention can be configured also to be multiphase, e.g. three-phase, for supplying into the normal public three-phase mains.

Furthermore, the invention is not restricted to a solar generator as direct voltage source, also fuel cells, batteries or the like can be used.

Embodiments of the invention are represented in the drawing and are explained in more detail in the subsequent description. There are shown:

DETAILED DESCRIPTION OF THE INVENTION

Figure 1:
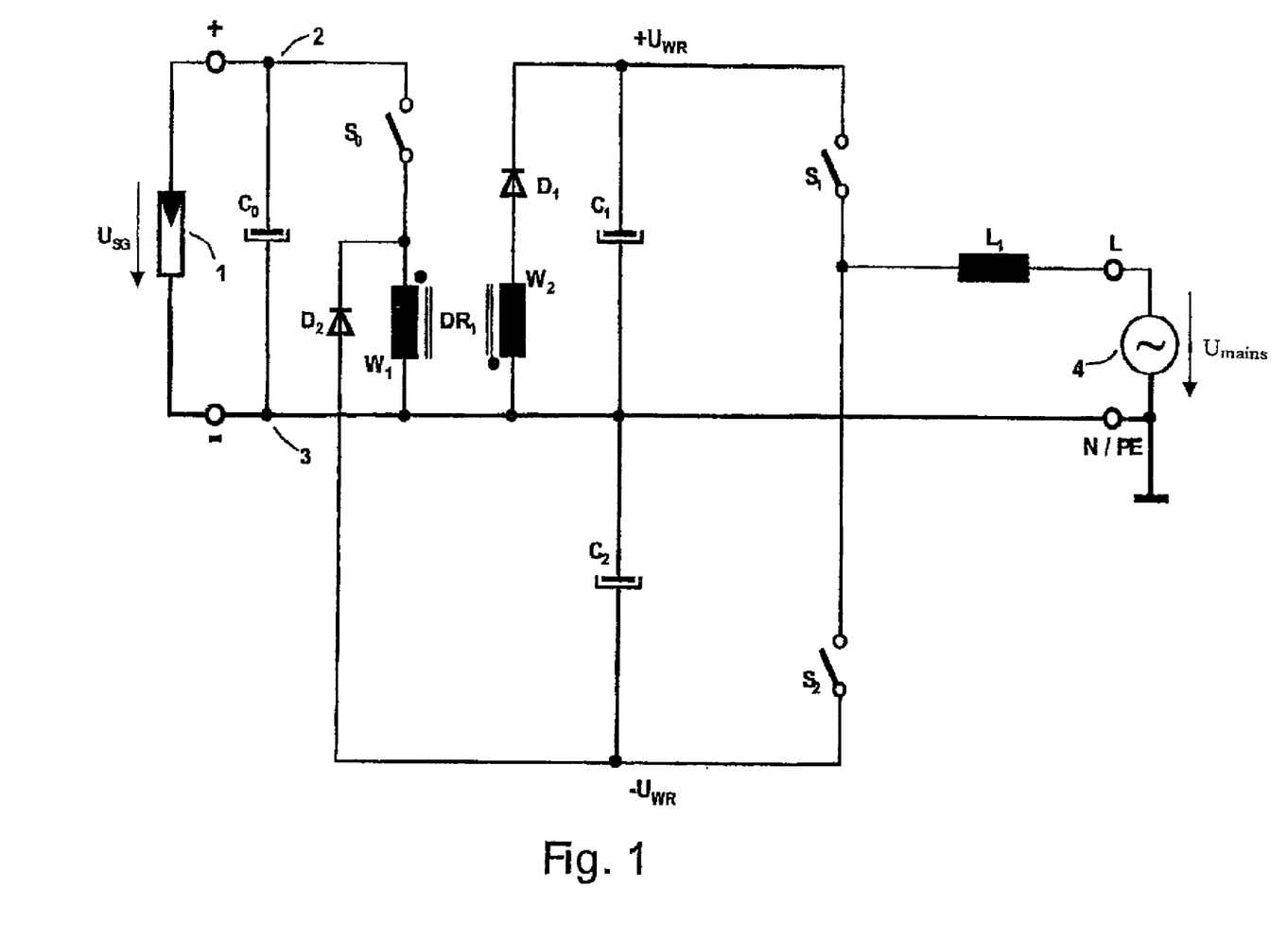
FIG. 1 a first circuit-type configuration of the invention,
FIG. 2 a second circuit-type configuration of the invention,
FIG. 3 a third circuit-type configuration of the invention,
FIG. 4 a fourth circuit-type configuration of the invention,
FIG. 5 a fifth circuit-type configuration of the invention, and
FIG. 6 a sixth circuit-type configuration of the invention.

The circuit arrangement represented in FIG. 1 has a direct voltage source which, in the embodiment, is a solar generator 1 which is located with the terminals thereof on a positive line 2 and on a neutral or earth conductor 3. This solar generator 1 delivers an input direct voltage $U_{SG}$. A capacitor $C_0$ which buffers the input voltage $U_{SG}$ is provided parallel to the solar generator 1. Between the lines 2, 3, there is located the series circuit of a first winding $W_1$ of a coil which is termed dual coil $DR_1$, and of a switch $S_0$ which is clocked by a control unit, not represented, and which can be configured as a transistor, preferably as a MOS-FET or as an IGBT. The points on the windings $W_1$, $W_2$ characterise the winding starts thereof in the known manner. The second winding $W_2$ of the dual coil $DR_1$ is connected by the winding start to the neutral conductor 3, the winding end being connected to a first recovery diode $D_1$ which is connected by its other terminal to a first storage capacitor $C_1$, the other terminal of which is located on the neutral conductor 3. At the connection point between first winding $W_1$ and the switch $S_0$, a second recovery diode $D_2$ is connected, the second terminal of which is connected to a second storage capacitor $C_2$, the second terminal of which is likewise located on the neutral conductor 3.

The dual coil represents a transformer with energy storing properties, the galvanic separation of which is however not used in the present case. The winding $W_1$ is used doubly for supplying energy and for producing a voltage inverted relative to the potential of the neutral conductor 3. The winding $W_2$ serves to produce a voltage with the same polarity as the input voltage relative to the neutral conductor. It is advantageous that the two intermediate circuit voltages $+/-U_{WR}$ can be both smaller and greater in value than the prescribed input voltage $U_{SG}$. The windings $W_1$ and $W_2$ advantageously have the same number of turns and are wound on a core closely coupled to each other, said windings also being able to be wound in a bifilar manner. The buffered input voltage $U_{SG}$ is applied via the switch $S_0$, which is clocked for example with 16 kHz, to the first winding $W_1$ of the dual coil $DR_1$, as a result of which, in the first clock phase in which the switch $S_0$ is connected through, a temporally increasing current is built up in the winding $W_1$, connected to an energy store in the magnetic circuit of the dual coil $DR_1$. In the second clock phase, the switch $S_0$ is opened and, in the two windings $W_1$ and $W_2$ of the dual coil $DR_1$, a recovery voltage is induced in such a manner that a charging current flows via the diode $D_1$ into the capacitor $C_1$ and at the same time a charging current flows via the diode $D_2$ into the capacitor $C_2$. Because of the equal number of turns of both windings $W_1$ and $W_2$ and their close coupling, the same voltage is induced in both so that, according to the charging processes, finally the two capacitors $C_1$, $C_2$ are charged without further balancing measures almost to the same voltage, e.g. 350 V. At the terminals of the storage capacitors $C_1$ and $C_2$ which are connected to the recovery diodes $D_1$ and $D_2$, a bipolar intermediate circuit voltage $+/-U_{WR}$ occurs, which supplies a subsequently connected inverter which is configured, in the represented case, as a half-bridge with the switches $S_1$ and $S_2$, the connection point of which is connected to a supply coil $L_1$. The other terminal of the supply coil $L_1$ is connected to one of the phases L of the mains 4 into which an alternating current is intended to be supplied, the mains voltage being termed $U_{mains}$.

The switches $S_1$ and $S_2$ of the half-bridge circuit are actuated in a manner known per se according to a specific clock pattern (e.g. pulse width modulation, PWM) by a control circuit, not represented, and a mains supply can be undertaken via the supply coil $L_1$. Hence, the bipolar intermediate circuit voltage $+/-U_{WR}$ obtained as described above can be converted via the subsequently connected inverter into a mains-conforming alternating current.

Figure 2:
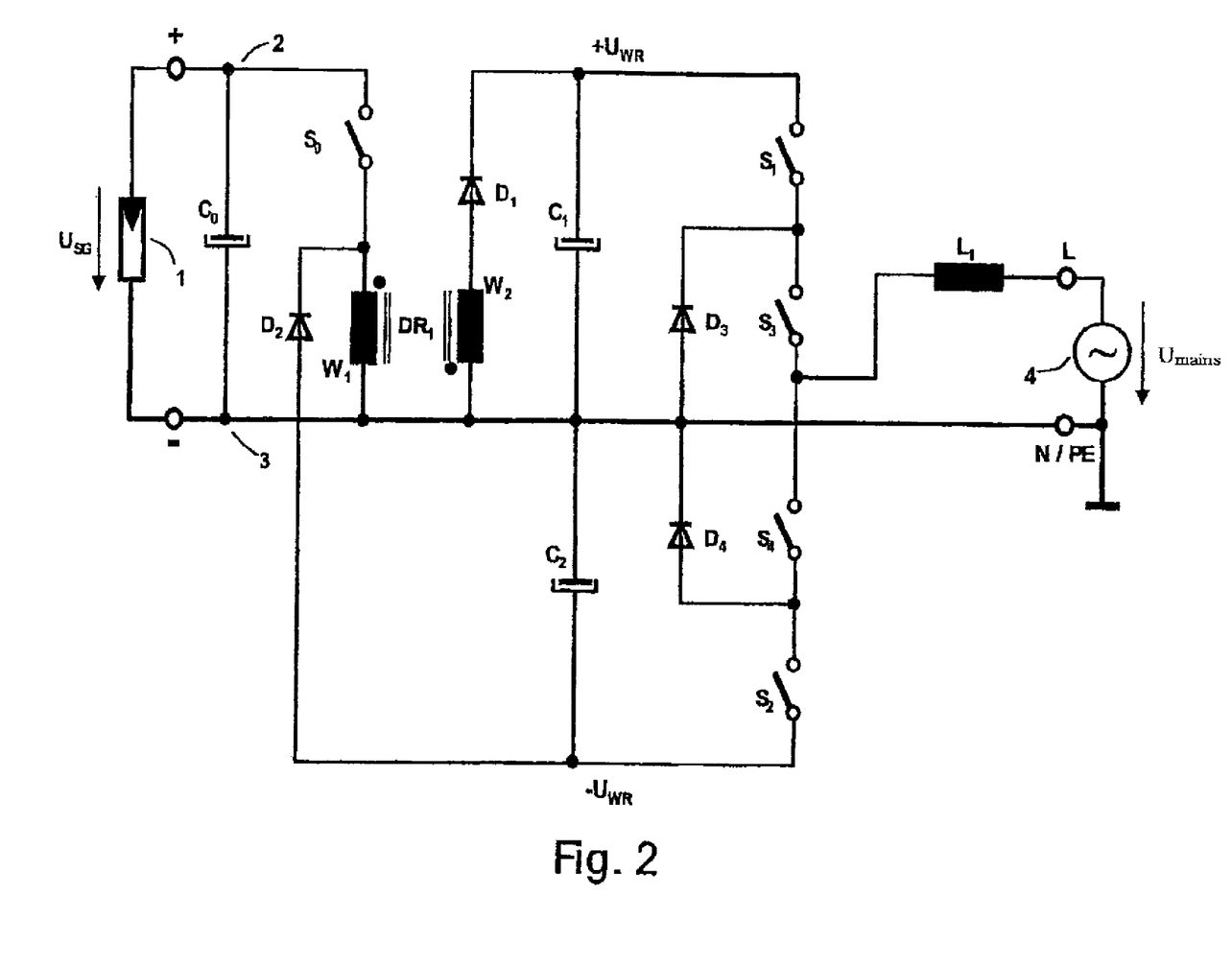

A further embodiment of the circuit arrangement according to the invention of an inverter with a voltage intermediate circuit is represented in FIG. 2. The circuit differs from the circuit arrangement according to FIG. 1 in that a so-called three-level circuit is used as inverter and comprises respectively two switches $S_1$, $S_3$ and $S_2$, $S_4$ which are connected in series, a recovery diode $D_3$ being connected between the connection point of the switches $S_1$ and $S_3$, said recovery diode being located with its second terminal on the neutral conductor 3, whilst the connection point between the switches $S_4$ and $S_2$ is connected via a recovery diode $D_4$ to the neutral conductor 3. The supply coil $L_1$ is located with its one terminal at the connection point between the switches $S_3$ and $S_4$.

The half-bridge circuit according to FIG. 1, with alternately closed switches $S_1$, $S_2$, allows only the two voltage levels $+U_{WR}$ and $-U_{WR}$ at the input of the coil $L_1$. The three-level circuit according to FIG. 2 allows, on the other hand, three switching states. In the positive half-wave, $S_3$ is permanently closed, $S_1$ is clocked with e.g. 16 kHz and the switches $S_2$ and $S_4$ remain open. When the switch $S_1$ is closed, the voltage $+U_{WR}$ occurs at the input of the coil $L_1$ and a current is built up. After opening $S_1$, the current flows further via the diode $D_3$ and the closed switch $S_3$. In the case of ideal components, the voltage drop over them would be zero volts, correspondingly also the input voltage at the coil $L_1$. Hence the latter is demagnetised substantially more slowly relative to the circuit according to FIG. 1, which has a positive effect on efficiency and the EMC behaviour. In the negative half-wave, the switches $S_2$ and $S_4$ are correspondingly used.

The represented inverter circuit has the advantage in addition that semiconductors with a lower electric strength and hence better electrical properties can be used. However it is disadvantageous that the current must always flow through at least two semiconductors.

Figure 3:
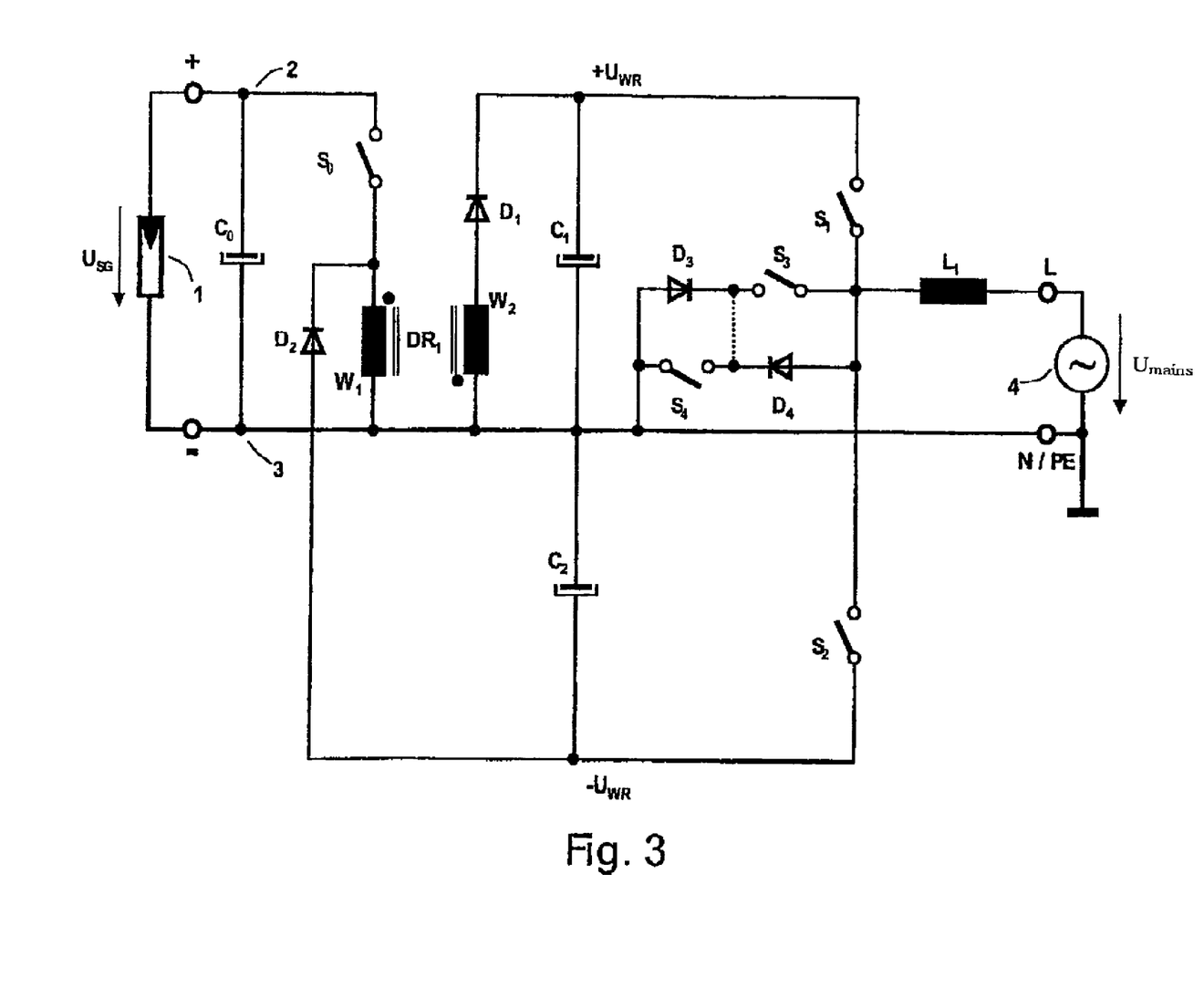

A further advantageous embodiment of a circuit arrangement is represented in FIG. 3, said circuit arrangement comprising, like that in FIG. 1, a half-bridge with the switches $S_1$ and $S_2$ and also the subsequently connected coil $L_1$, but differs in that additional recovery branches between the connection point between the switches $S_1$ and $S_2$ and the neutral conductor 3 are provided, which comprise a switch $S_3$ and a diode $D_3$ and a diode $D_4$ and a switch $S_4$. Like that according to FIG. 2, this circuit also allows three switching states with the indicated advantages. The same function of the additional recovery path is fulfilled here by the switches $S_3$, $S_4$, together with the diodes $D_3$, $D_4$. In the positive half-wave, $S_3$ is permanently closed, correspondingly $S_4$ in the negative one. The advantage relative to the circuit according to FIG. 2 resides in the fact that in the build-up phase of the current, in which for example switch $S_1$ is closed, the current need flow only through one switch, i.e. $S_1$, as a result of which the efficiency is increased relative to the circuit according to FIG. 2.

A connection between the two recovery paths is represented in broken lines in FIG. 3. In the connected case, so-called co-packs are used as electronic switches, in the case of which an IGBT, for example switch $S_3$, is wired to a recovery diode, e.g. diode $D_4$, in a common housing. With two such commercially available components, the desired switch/diode combination can then be constructed. The same arrangement is produced if MOS-FETs are used as switches—the body diodes inherently present with MOS-FETs take over the function of the recovery diodes.

Figure 4:
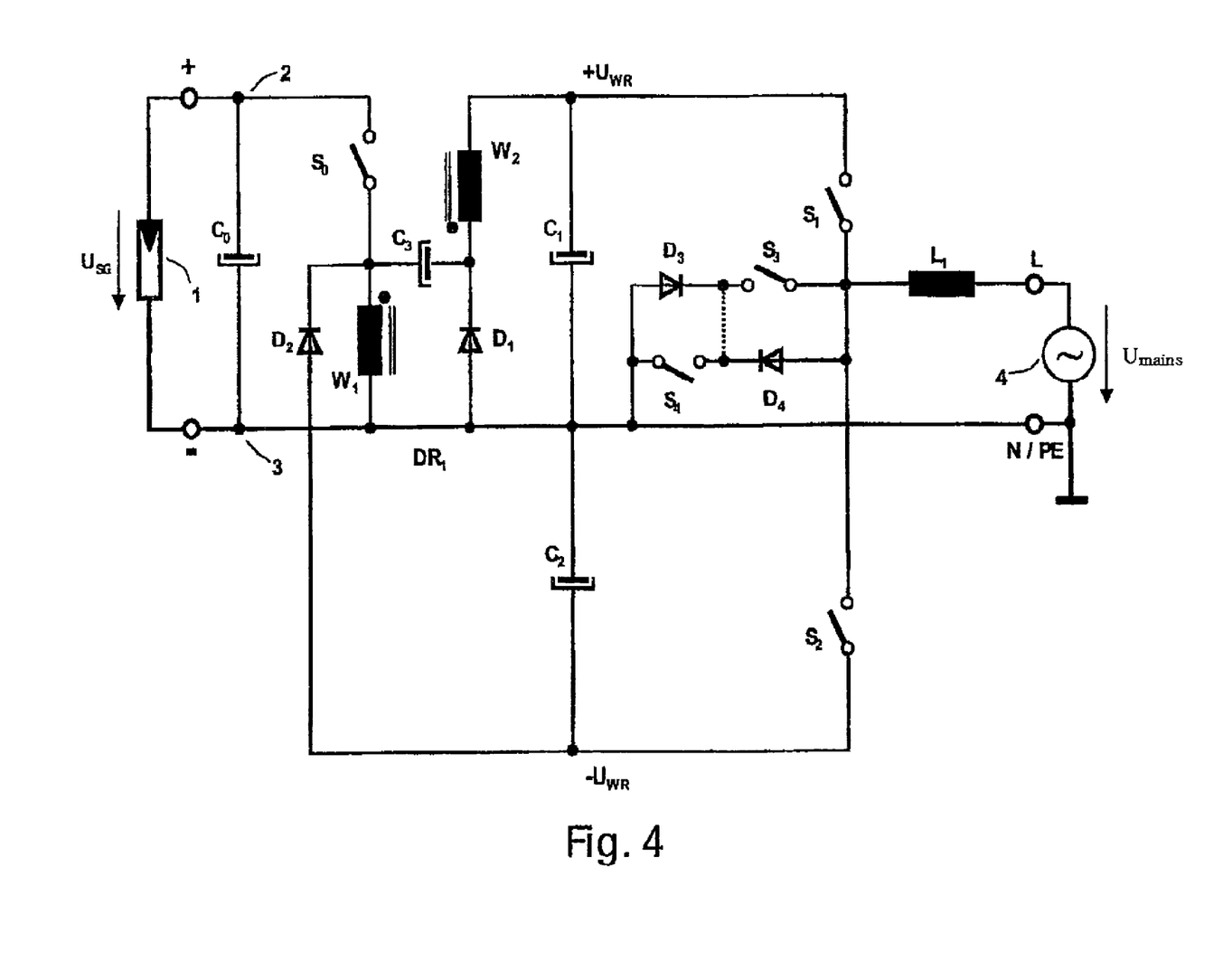
Figure 5:
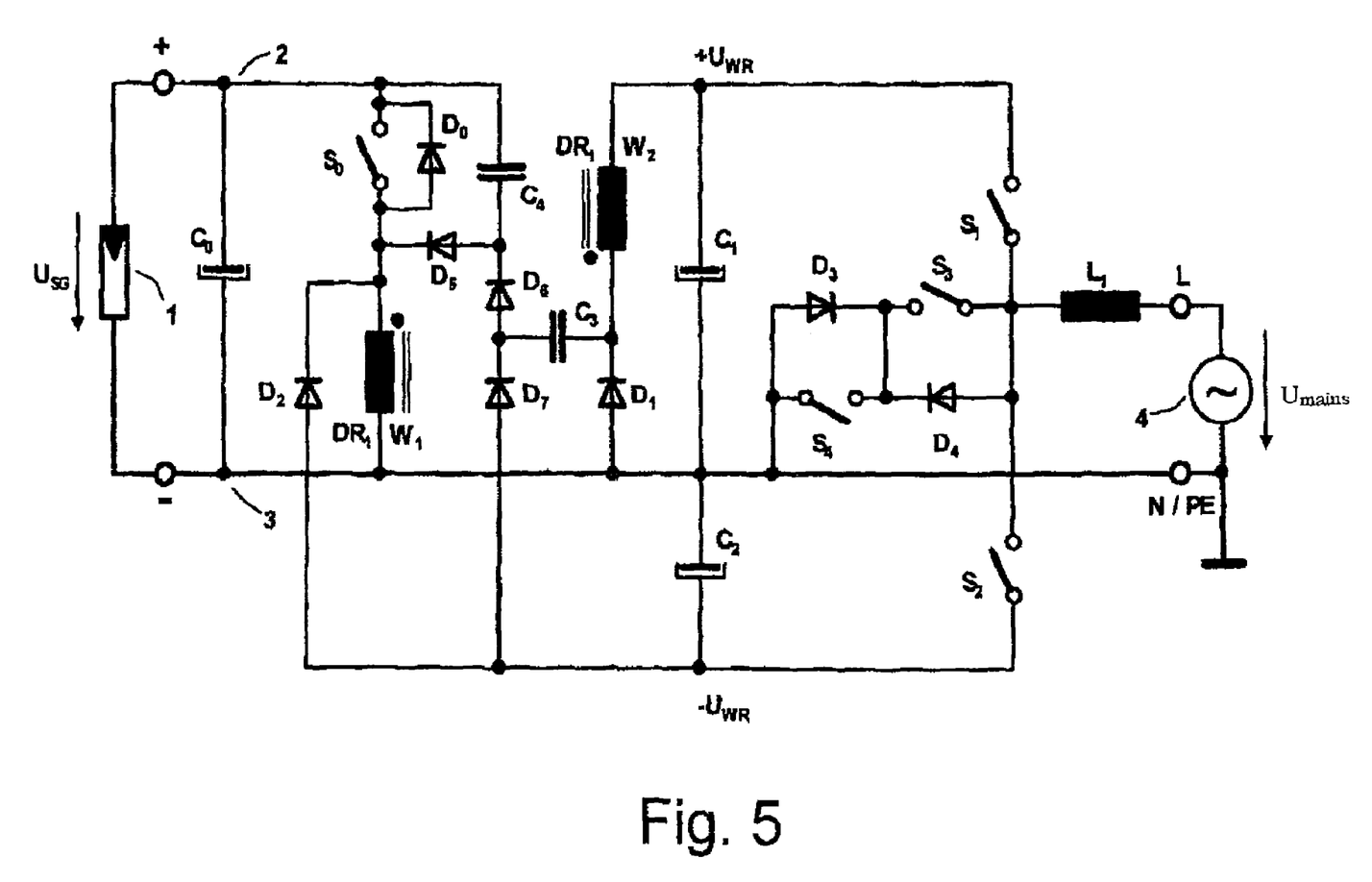

In FIG. 4 and FIG. 5, further embodiments are represented which are particularly preferred circuits.

FIG. 4 differs from the embodiment according to FIG. 3 in that the sequence within the series circuit of the winding $W_2$ of the dual coil $DR_1$ and the recovery diode $D_1$ is exchanged. This means that the recovery diode $D_1$ is connected by its one terminal to the neutral conductor 3 and, by its other terminal, to the winding start of the winding $W_2$, the other terminal of which is connected to the capacitor $C_1$. In addition, a capacitor $C_3$ is connected respectively to the winding start of the winding $W_1$ and to the winding start of the winding $W_2$. Basically, the functional mode is as described previously, i.e. the general function remains unchanged. However, it is of advantage that both winding ends of the windings $W_1$, $W_2$ are at rest potential, i.e. at the reference potential, which is prescribed by the neutral conductor 3, or at the intermediate circuit voltage $+U_{WR}$ applied to the intermediate circuit capacitor $C_1$. The two winding starts have thus the same temporal voltage course relative to each other, offset by the level of the intermediate circuit voltage $+U_{WR}$. Hence, the two windings $W_1$, $W_2$ can be wound very closely adjacent to each other, for example as a bifilar winding, since the parasitic coupling capacitance forming between the two windings need not have a charge reversal at each cycle. From the spatially narrow construction there results a very good magnetic coupling of the windings $W_1$, $W_2$ and hence a low leakage inductance, an improved EMC behaviour and also lower switching losses in the switch $S_0$.

Since in the circuit according to FIG. 4 the two winding starts ideally have the same voltage course but offset by the value of the output voltage $U_{WR}$, the two winding starts can be connected to the capacitor $C_3$. This additional capacitor $C_3$, when switching off the switch $S_0$, absorbs a part of the energy stored in the primary-side leakage inductance of the dual coil $DR_1$ and emits this in the next cycle via the winding $W_2$ to the output $+U_{WR}$. As a result, excess voltages are limited during the switching process and further balancing of the output voltages is achieved.

In the circuit according to FIG. 4, the coupling capacitor $C_3$ has, as mentioned, the task of absorbing the energies stored in the leakage inductances and ensuring equalisation between the two intermediate circuits. However, the capacitor must be designed to be relatively large for this purpose, e.g. several 100 µF in the case of a 5 kW appliance. A compromise with respect to a smaller capacitor would reside in making the numbers of turns of the windings $W_1$ and $W_2$ not exactly equal but in giving the winding $W_2$ a somewhat higher number of turns. Hence, in the case of small powers, the voltage at the intermediate circuit capacitor $C_1$ would be slightly excessive, in the case of average powers, both would correspond well and, with full power, the negative intermediate circuit capacitor $C_2$ would be supplied in addition from the leakage inductance of the first winding $W_1$ so that its voltage would be slightly above that of $C_1$. With such a solution, a clock-frequency alternating voltage however then occurs at the coupling capacitor $C_3$, associated with undesired currents through $C_3$ and through all surrounding components.

In FIG. 5, the mentioned problem is taken into account. Furthermore, a coupling capacitor $C_3$ is connected between the second winding $W_2$ and assigned recovery diode $D_1$, the other terminal of $C_3$ being connected to a first and second diode $D_6$ and $D_7$. $D_7$ is located with its other terminal at the negative intermediate circuit voltage $-U_{WR}$ and $D_6$ is connected to a further capacitor $C_4$ which is applied at the positive line 2 or at the corresponding terminal of the clocked switch $S_0$. At the connection point between $C_4$ and first diode $D_6$, a third diode $D_5$ is connected, said third diode being located with its cathode at the connection point between the switch $S_0$ and the first winding $W_1$. Parallel to the switch $S_0$, a recovery diode $D_0$, which can also be present in the other embodiments, is provided.

In order that the coupling capacitor $C_3$ can be kept small (e.g. $C_3=100$ nF), the windings, as mentioned above, are designed differently ($W_2$ has more turns) so that the voltage differences of the intermediate circuits remain tolerable both with a small load and with a large load. Capacitor $C_3$ no longer has the task (see FIG. 4) of holding the two intermediate circuit capacitors together with respect to voltage. Rather, it prevents, in the interaction with the diodes $D_5$, $D_6$, $D_7$, the occurrence of damagingly high voltages across the diode $D_1$ due to transient phenomena at the winding $W_2$ when switching on the switch $S_0$.

The coupling capacitor $C_3$ is charged on average to the positive intermediate circuit voltage $+U_{WR}$. When the switch $S_0$ is closed, the start of the winding $W_2$ is at the voltage $(U_{SG}+U_{WR})$. If spikes occur, then the diodes $D_0$, $D_5$ and $D_6$ become conductive and delimit the voltage at the second winding $W_2$.

If only this fundamentally important limiting function is intended to be produced, then the third diode $D_5$ and the capacitor $C_4$ can be dispensed with.

With the diode $D_5$ and the capacitor $C_4$, additional relief of the switch $S_0$ when switching off is achieved.

The initial situation may be a closed circuit $S_0$ and a discharged capacitor $C_4$. If now the switch opens, then the inductance of the dual coil attempts to maintain the current flow. Since the switch does not open ideally rapidly (in particular IGBTs), current and voltage occur at the same time in the switch for a certain time, which leads to the thus mentioned switching losses. These can be reduced if a switch relieving is provided, here in the form of the capacitor $C_4$. As soon as the voltage across the switch increases, the capacitor $C_4$ is charged via the diode $D_5$—the coil current therefore flows in the ideal case completely through $D_5$ and $C_4$ and the switch is relieved. At the end of the cut-off process, the capacitor $C_4$ is charged to the sum of the input voltage $U_{SG}$ and the negative intermediate circuit voltage $-U_{WR}$. The next time the switch $S_0$ is switched on, the energy stored in the capacitor $C_4$ is supplied back to the input circuit again almost loss-free in that, via the second winding $W_2$, the coupling capacitor $C_3$ and also the first diode $D_6$, a charge reversal current flows until the capacitor $C_4$ is again completely discharged. Further charge reversal is prevented via the diodes $D_5$ and $D_0$. In order that the charge reversal functions as described, $C_3 \gg C_4$ should be chosen, which however is provided anyway because of the double function of $C_3$.

Figure 6:
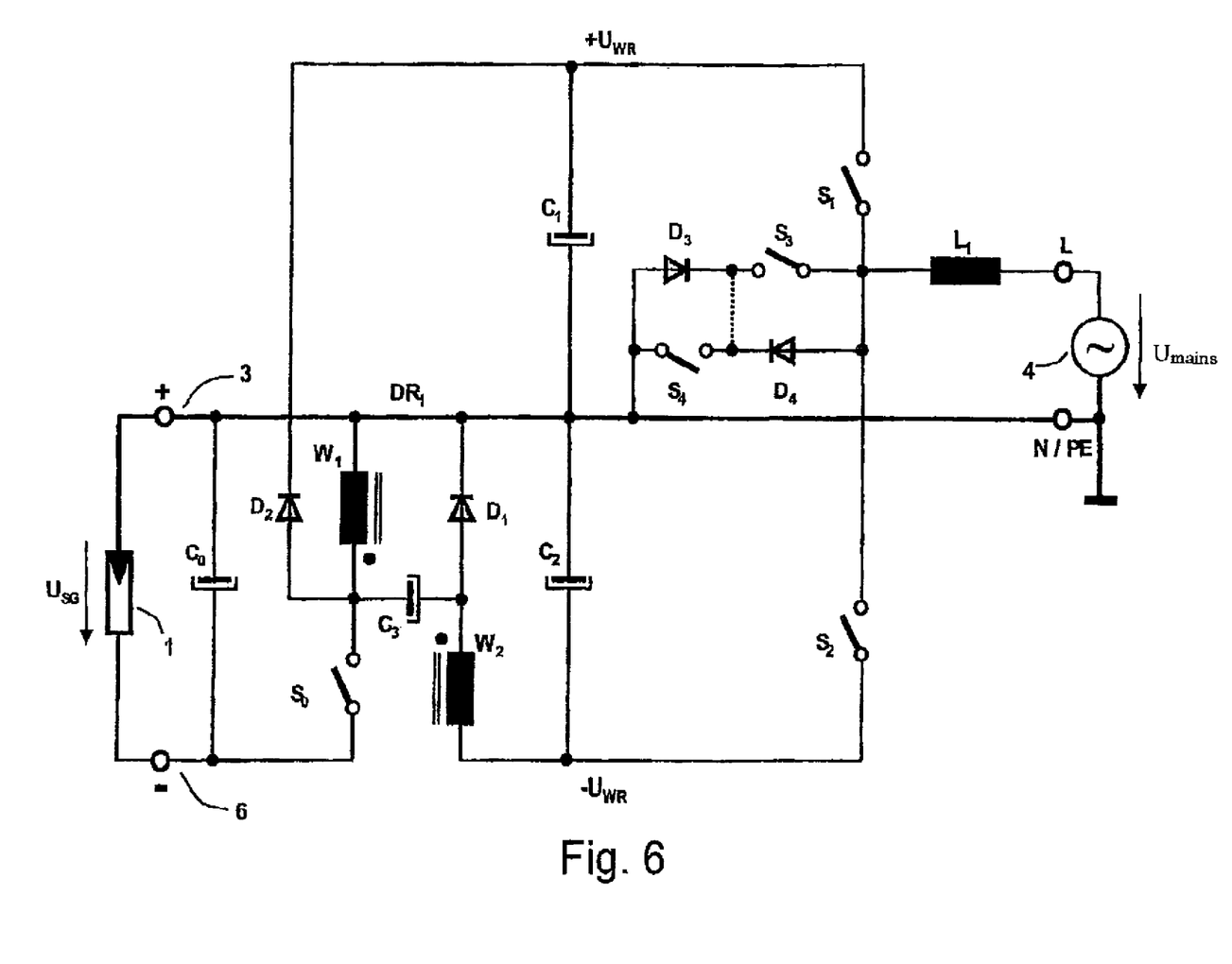

The circuits according to FIGS. 1 to 5 can also have a complementary construction. FIG. 6 shows by way of example the complementary construction of the circuit according to FIG. 4.

In FIG. 6, the positive terminal of the direct voltage source 1, i.e. of the solar generator, is located on the neutral conductor 3. This has the advantage that all the modules of the solar generator 1 have a negative potential relative to earth potential, which has an advantageous effect on the efficiency thereof with specific types of solar cells. Furthermore, the switch $S_0$ is located in the negative supply voltage line 6, which simplifies its actuation with respect to circuit technology, in particular if a plurality of parallel-operating input steps is provided. As already mentioned, preferably MOSFETs or IGBTs of the N-channel type are used as switches. N-channel transistors require a positive gate voltage of e.g. 15 V relative to the emitter potential for actuation, for which purpose an auxiliary voltage must be made available.

If a plurality of transistors with their emitters is at the same potential, a common auxiliary voltage source can advantageously be used.

The input stage comprising the capacitor $C_0$, the switch $S_0$, the dual coil $DR_1$, the recovery diodes $D_1$, $D_2$ and also the coupling capacitor $C_3$ can also be provided in multiple form in all the embodiments and supply a common intermediate circuit comprising the intermediate circuit capacitors $C_1$, $C_2$.

The individual input stages can be thereby connected to the input terminals connected to the lines 2 and 3 or 3 and 6 and be supplied from the same source.

Advantageously, the associated switches $S_0$ are thereby clocked in a temporally offset manner so that, both at the input, i.e. at the respective capacitors $C_0$, and at the output, i.e. at the capacitors $C_1$, $C_2$, a comparable power flow is produced, resulting in a lower alternating current loading of these capacitors. Furthermore, a so-called master-slave operation is possible, in which the individual input stages are activated as a function of the power to be transmitted instantaneously. As a result, the efficiency course can be significantly improved, in particular in the partial load range.

If a plurality of input stages is present, then these can also have separate input terminals which in turn can be connected to associated, even different, solar generators or other direct voltage sources.

In the above embodiment, a solar generator is used as direct voltage source. However, also fuel cells or batteries or the like can be provided.

The invention claimed is:

1. Circuit arrangement for producing an alternating voltage or an alternating current from a direct voltage source which is configured unipolar relative to a neutral conductor and with an inverter, the direct voltage source being connected to a converter which converts a unipolar voltage of the direct voltage source into a bipolar intermediate circuit voltage which is stored in a buffer circuit connected to the inverter, wherein the converter comprises a clocked switch and an energy converting unit which is configured as a dual coil having first and second windings, each having a winding start and winding end, and the windings being disposed closely coupled to each other and the converter being configured in such a manner that energy delivered via the clocked switch is stored intermediately and, therefrom, a voltage inverted relative to a potential of the neutral conductor is produced at the first winding and a voltage with an identical polarity as the unipolar voltage is produced at the second winding, and wherein winding starts of the windings of the dual coil are connected to each other via a coupling capacitor.

2. Circuit arrangement according to claim 1, wherein the buffer circuit has at least two storage capacitors and a recovery diode is assigned to each winding of the dual coil, so that a respective charging current for the storage capacitors flows through the recovery diode.

3. Circuit arrangement according to claim 1, wherein in an ON switching phase of the switch, energy storage takes place in a magnetic circuit of the dual coil and, in an OFF switching phase of the switch, a recovery voltage is induced in both windings.

4. Circuit arrangement according to claim 1, wherein a series circuit comprising the switch and the first winding of the dual coil is disposed parallel to the direct voltage source.

5. Circuit arrangement according to claim 2, further comprising a first recovery diode and a second recovery diode, wherein the first recovery diode is connected between the winding start of the second winding of the dual coil and the neutral conductor, and the second recovery diode is connected between the winding start of the first winding of the dual coil and one of the storage capacitors of the buffer circuit.

6. Circuit arrangement according to claim 1, wherein the winding start of the first winding is connected via a recovery diode to one of the storage capacitors and the winding end of first winding to the neutral conductor, and wherein the winding end of the second winding is connected to one of the other storage capacitors and its winding start is connected via another recovery diode to the neutral conductor.

7. Circuit arrangement according to claim 1, wherein the windings of the dual coil have the same number of turns.

8. Circuit arrangement according to claim 1, wherein a ratio of a number of turns of the first winding and of the second winding is less than 1.

9. Circuit arrangement according to claim 1, wherein the second winding is connected to a limiting circuit for limiting the voltage produced at the second winding during connection of the clocked switch.

10. Circuit arrangement according to claim 9, wherein the coupling capacitor has a terminal connected to the second winding and has another terminal connected to a first and second diode, the second diode being at a negative intermediate circuit voltage and the first diode being connected to a connection point between the switch and the first winding.

11. Circuit arrangement according to claim 10, wherein a circuit for relieving the clocked switch is provided when switching off, said circuit comprising a capacitor and a third diode.

12. Circuit arrangement according to claim 11, wherein the capacitor and the third diode of the circuit for relieving the clocked switch are connected to terminals of the clocked switch and a connection point between said capacitor and third diode is connected to the first diode.

13. Circuit arrangement according to claim 1, wherein the windings of the dual coil are bifilar windings.

14. Circuit arrangement according to claim 1, wherein the inverter is configured as a half-bridge, with a supply coil being connected between two switches of the half-bridge.

15. Circuit arrangement according to claim 14, further comprising wherein, two recovery branches each comprising a switch and a recovery diode, wherein the inverter is configured as a half-bridge comprising two switches connected to a common node, each of the branches connected between the neutral conductor and the common node.

16. Circuit arrangement according to claim 1, wherein the inverter has two pairs of two electronic switches which are connected in series, a connection point of the two pairs being connected to a supply coil and wherein one pair of switches is connected via recovery diodes to the neutral conductor, and further having a control device controlling the switches respectively of one pair in such a manner that one switch of the pair is closed and another switch of the pair is clocked.

17. Circuit arrangement according to claim 1, wherein the direct voltage source is a solar generator, a fuel cell and/or a battery.

18. Circuit arrangement according to claim 1, wherein the direct voltage source is configured as a solar generator and is connected by a negative terminal thereof to the neutral conductor and any modules of the direct voltage source have a positive potential relative to the neutral conductor.

19. Circuit arrangement according to claim 1, wherein the direct voltage source is configured as a solar generator and is connected by a positive terminal thereof to the neutral conductor and any modules of the direct voltage source have a negative potential relative to the neutral conductor.

20. Circuit arrangement according to claim 1, wherein a plurality of input stages comprising an electronic switch, double coil and assigned recovery diodes is present and supplies common buffer capacitors.

21. Circuit arrangement according to claim 20, wherein each of the individual input stages are connected in parallel and are switched on as a function of power to be transmitted instantaneously.

22. Circuit arrangement according to claim 20, wherein the plurality of input stages can be used independently of each other and are supplied at the same time from different sources, the different sources comprising solar generators, fuel cells or batteries.

\* \* \* \* \*